United States Patent [19]

Kitaj

[11] 3,998,985

[45] Dec. 21, 1976

[54] METHOD OF IMPROVING ADHESION OF VINYL POLYMERS TO GLASS

[75] Inventor: Walter Kitaj, Toledo, Ohio

[73] Assignee: Owens-Illinois, Inc., Toledo, Ohio

[22] Filed: Mar. 3, 1975

[21] Appl. No.: 554,957

[52] U.S. Cl. .............................. 427/386; 260/827; 427/387; 428/417; 428/441; 428/442; 428/447

[51] Int. Cl.² ..................... B05D 3/02; B32B 17/10

[58] Field of Search .......... 428/417, 441, 442, 447; 427/386, 387; 260/827

[56] References Cited

UNITED STATES PATENTS

| | | | |
|---|---|---|---|
| 3,211,684 | 10/1965 | Eakins | 428/417 X |
| 3,362,843 | 1/1968 | Smith et al. | 428/417 X |
| 3,438,801 | 4/1969 | Schlientz et al. | 427/402 X |
| 3,554,787 | 1/1971 | Plymale | 428/500 X |
| 3,655,353 | 4/1972 | Nalley et al. | 427/385 X |
| 3,734,763 | 5/1973 | Plueddeman | 428/441 X |
| 3,779,981 | 12/1973 | Ward | 427/386 X |

*Primary Examiner*—Harry J. Gwinnell
*Attorney, Agent, or Firm*—Robert F. Rywalski; Edward J. Holler

[57] ABSTRACT

An exceptional increase in adhesion between vinyl polymers and glass is obtained when the polymer is mixed with a primer plus an aminosilane containing more than one amino group and applied to a glass surface in combination as a single coating rather than separately. Excellent adhesive bonding results by this method even after exposure of the bonded surface to aqueous solutions containing 4% by weight of alkali for 30 minutes at 65° C.

7 Claims, No Drawings

METHOD OF IMPROVING ADHESION OF VINYL POLYMERS TO GLASS

BACKGROUND OF THE INVENTION

Several different compounds and combinations thereof have been used in the past as coupling agents for adhering various polymers to glass, especially as protective coatings to prevent abrasion, increase lubricity and to increase alkali resistance of the bond when glass containers so coated are washed. Typical of the types of compounds used are the epoxy reactive silanes shown in U.S. Pat. No. 3,666,539 as well as a mixture of an aminoalkylalkoxysilane and an epoxy resin-methyl methacrylate primer as disclosed in U.S. Pat. No. 3,362,843. As stated in the latter patent, a vinyl resin coating has no natural affinity for glass in that once applied it can be easily peeled therefrom. Thus, the problem of providing an adequate bond between a vinyl coating and glass still exists so that if the protective vinyl envelope around a plastisol coated glass container is accidentally ruptured it will prevent glass fragments from being scattered over a wide area.

Another compound now used as a coupling agent which provides excellent adhesion of vinyl polymers to glass is set forth in U.S. Pat. No. 3,734,763. This compound is N-[beta-(N'-paravinylbenzyl)-aminoethyl]-gamma-aminopropyltrimethoxysilane hydrochloride having the formula

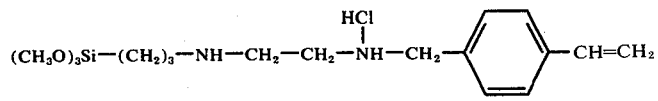

The same compound referred to as XZ8-5069 is also described in Applied Polymer Symposium, 19, 75 (1972) as a virtually universal coupling agent and adhesion promoter for almost all plastics to almost all rigid surfaces.

Typical of the mixtures used as coupling agents for various polymers and glass is XZ8-5066 marketed by Dow-Corning Corp., Midland, Michigan which contains 8.4 parts by weight of an epichlorohydrin-bisphenol A resin having an epoxide equivalent of 182 to 189 (commonly known as Epon 820 as described in U.S. Pat. No. 3,666,539, hereby incorporated by reference) and 1.6 parts by weight of N-aminoethyl-gamma-aminopropyltrimethoxysilane (sold by Dow Corning Corp., Midland, Michigan as Z-6020 and by Union Carbide Corp., New York, New York as A-1120) in 45 parts by weight each of ethyleneglycolmonomethyl ether and ethyleneglycolmonoethylether acetate.

Despite the virtues of the coupling agents used in the past, the adhesion obtained between the polymer and glass is still not satisfactory when the coated glass is washed in dilute alkali. It was therefore desirable to develop a more efficacious bond especially for vinyl polymers and glass which would be more alkali resistant, which could be applied economically in a single step and which would render a glass container shatter-proof.

SUMMARY OF THE INVENTION

This invention is based upon the discovery that when a vinyl polymer such as polyvinyl chloride, polyvinylidene chloride, polyvinyl acetate or a copolymer thereof is mixed with a primer such as XZ8-5066 and a polyamino silane such as N-aminoethyl-gamma-aminopropyltrimethoxysilane and the combination is applied to a glass surface and cured for about 30 minutes at about 150° C., exceptionally good adhesion results between the polymer and the glass compared to the adhesion obtained when the primer alone, the polyaminosilane alone, a non-amino or monoaminosilane alone, or the primer plus a non-amino or monoaminosilane is first applied to the glass and then the vinyl polymer is separately applied thereover, or the vinyl polymer is combined with a non-amino or monoaminosilane or combined with the primer only or the polymer is combined with the primer plus any silane other than a polyamino silane.

THE PREFERRED EMBODIMENTS

The vinyl polymers contemplated for use in the coating method of the present invention include the plasticized or unplasticized polymers and copolymers of vinyl acetate, vinyl chloride and polyvinylidene chloride and mixtures thereof. Vinyl plastisols are preferred. These are dispersions or suspensions of vinyl polymers, plasticizers and stabilizers. The most common vinyl polymers are vinyl chloride and vinyl chloride-vinyl acetate. An especially preferred plastisol is composed of 100 parts by weight of polyvinyl chloride and 60 parts by weight of a plasticizer sold under the trade names of Denflex 9319A and Goodrich 131-71-10. Other vinyl polymers commercially available include Geon 121, Exon 654, Opalon 410, Bakelite QYOH and Marvinol VR-51. In every case, the vinyl plastisol is mixed with the primer XZ8-5066 and a polyaminosilane before application to the glass surface.

The polyaminosilanes which are operable in the method of this invention have the formula

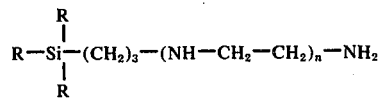

wherein each R is the same loweralkoxy radical containing from 1 to 4 carbon atoms and $n$ is an integer from 1 to 30. Typical of such silanes are N-aminoethyl-gamma-aminopropyltrimethoxysilane; Y-5162 silane wherein each R above is methoxy and $n$ is 2 as well as Y-5691 which is a polyaminosilane with a molecular weight of over 1000. The latter two silanes are both available from Union Carbide Corporation. Y-5162 is a clear, straw colored liquid soluble in methanol, ethanol, benzene and methyl cellosolve whereas Y-5691 is a solid soluble in methanol, ethanol and isopropanol and used as a 50% solution in isopropanol.

Excellent adhesion to glass is obtained when 10 to 20% by weight of XZ8-5066 and 1 to 2% by weight of polyaminosilane is combined with 78 to 89% by weight of vinyl plastisol. The combination can be applied to the glass surface by doctorblade, spraying or dipping to form a coating about 25 mils thick which after curing about 30 minutes to 150° C. produces a dry coating of 4 to 10 mils thick.

The following examples are presented to illustrate rather than limit the invention.

EXAMPLES 1 – 15

Various proportions of polyvinyl chloride plastisol (Denflex 9319A sold by Dennis Chemical Co., St. Louis, Missouri) were combined with various amounts of XZ8-5066 primer and different polyaminosilanes and applied in combination to a glass surface by doctorblade to form a dry coating about 10 mils thick after curing 30 minutes at 150° C. The coatings thus formed were immersed in aqueous solutions containing 4% by weight of sodium hydroxide for 30 minutes at 65° C. and the adhesion was then measured with a conventional adhesion tester as pounds per one inch width of the coating. The adhesion of these coatings was then compared with the adhesion obtained when the plastisol was separately applied over (1) the primer alone, (2) the polyaminosilane alone, (3) a non-aminosilane alone, (4) a mono-amino silane alone, (5) the primer plus a non-amino silane, (6) the primer plus a monoaminosilane or (7) the plastisol was combined with a non-aminosilane only and applied to glass or (8) the plastisol was combined with a mono-aminosilane only and applied to glass or (9) the plastisol was combined with the primer only and applied to glass or (10) the plastisol was combined with the primer and a silane other than a polyaminosilane and applied to glass. The results obtained are shown in the table below wherein A-1100 is gamma-aminopropyltriethoxysilane, A-172 is vinyl tris (beta-methoxyethoxy) silane, A-186 is beta-(3,4-epoxycyclohexyl)-ethyltrimethoxysilane and all percentages are by weight.

TABLE 1

| Ex. No. | Composition Applied As A Combination | Adhesion (lbs.) |
|---|---|---|
| 1 | 20% primer + 1% Z-6020 + 79% plastisol. | 10 |
| 2 | 15% primer + 1% Y-5691 + 84% plastisol. | 8 |
| 3 | 15% primer + 1.5% Z-6020 + 83.5% plastisol. | 8 |
| 4 | 10% primer + 1% Z-6020 + 89% plastisol. | 6 |
| 5 | 15% primer + 1% Y-5162 + 84% plastisol. | 4 |
| 6 | 15% primer + 1% A-1100 + 84% plastisol. | 3 |
| 7 | 15% primer + 85% plastisol. | 1 |
| 8 | 1% A-1100 + 99% plastisol. | 0 |
| 9 | 1% A-186 + 99% plastisol. | 1 |

| Ex. No. | Separate Application | Adhesion (lbs.) |
|---|---|---|
| 10 | 15% primer, then apply 85% plastisol. | 0 |
| 11 | 1% Y-5691, then apply 99% plastisol. | 0 |
| 12 | 1% A-172, then apply 99% plastisol. | 0 |
| 13 | 1% A-1100, then apply 99% plastisol. | 0 |
| 14 | 15% primer + 1% A-172, then apply 84% plastisol. | 0 |
| 15 | 15% primer + 1% A-1100, then apply 84% plastisol. | 0 |

The unexpected increase in adhesion to glass obtained by combining XZ8-5066 primer, a polyaminosilane and the vinyl plastisol is apparent from the results of examples 1–5 when compared to other combinations shown in Examples 6–9 or separate applications of primer, aminosilane, non-aminosilane, monoaminosilane or primer plus either a non-aminosilane or a monoaminosilane before applying the plastisol as set forth in Examples 10–15. It should be noted that the polyaminosilane Y-5691 which was used as a 50% alcoholic solution was three times as effective as Z-6020 having only two amino groups. Although the primer used contains a small amount of the Z-6020 silane it is apparent that additional silane is required to obtain superior adhesion after an alkaline wash.

EXAMPLE 16

Seventy-eight parts by weight of a polyvinyl chloride-polyvinyl acetate plastisol containing 90% polyvinyl chloride and plasticized with dioctyl phthalate is combined with 2 parts by weight of Y-5691 silane previously identified and 20 parts by weight of XZ8-5066 primer also previously identified and a glass panel is dipped in the resulting mixture. The coating formed is cured for 30 minutes at 150° C. and the coated glass panel is then immersed in an aqueous solution containing 4% by weight of alkali for 30 minutes at 65° C. The adhesion which results is found to be excellent.

Similar improvements in adhesion are obtained when other polyaminosilanes of the formula hereinbefore set forth are mixed with XZ8-5066 primer and a vinyl plastisol in the ratios previously designated and applied to a glass surface as a single coating rather than applied separately. All such combinations are considered to be within the scope of the present invention.

I claim:

1. A method of improving the adhesion of a vinyl plastisol to a glass surface which comprises applying thereto as a single coating a combination consisting essentially of said plastisol, a polyaminosilane and a primer consisting of 8.4 parts by weight of an epichlorohydrin-bisphenol A resin, 1.6 parts by weight of N-aminoethyl-gamma-aminopropyltrimethoxysilane and 45 parts by weight each of ethyleneglycolmonomethyl ether and ethyleneglycolmonoethylether acetate and thereafter curing said coating.

2. A method as in claim 1 in which the combination employed is prepared prior to application by admixing 78 to 89% by weight of vinyl plastisol, 1 to 2% by weight of polyaminosilane and 10 to 20% by weight of primer and wherein said polyaminosilane is N-aminoethyl-gamma-amino propyltrimethoxysilane.

3. A method as in claim 1 in which the polyaminosilane has the formula

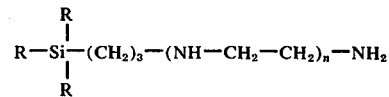

in which each R is the same loweralkoxy radical containing from 1 to 4 carbon atoms and $n$ is an integer from 1 to 30.

4. A method as in claim 3 in which the polyaminosilane is N-aminoethyl-gamma-amino propyltrimethoxysilane.

5. A method as in claim 1 in which the vinyl plastisol is a polyvinyl chloride plastisol.

6. A method as in claim 1 in which the vinyl plastisol is a polyvinyl chloride-polyvinyl acetate plastisol.

7. A method as in claim 1 in which the cured coating is 4 to 10 mils thick.

* * * * *